(12) United States Patent
Ambeskar et al.

(10) Patent No.: US 12,439,351 B2
(45) Date of Patent: Oct. 7, 2025

(54) COMMUNICATION SYSTEMS AND METHODS FOR SYNCHRONIZING CLOCK TIMING AND FREQUENCY

(71) Applicant: Hughes Network Systems, LLC, Germantown, MD (US)

(72) Inventors: Nimesh Ambeskar, Germantown, MD (US); Jack Lundstedt, Monrovia, MD (US); Yogesh Sethi, Boyds, MD (US); Patrick O'Neil, Germantown, MD (US); Tyler Horwat, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 659 days.

(21) Appl. No.: 17/742,071

(22) Filed: May 11, 2022

(65) Prior Publication Data

US 2023/0370984 A1 Nov. 16, 2023

(51) Int. Cl.
*H04W 56/00* (2009.01)
*G04R 20/04* (2013.01)

(52) U.S. Cl.
CPC ........ *H04W 56/0015* (2013.01); *G04R 20/04* (2013.01); *H04W 56/005* (2013.01)

(58) Field of Classification Search
None
See application file for complete search history.

(56) References Cited

U.S. PATENT DOCUMENTS

| | | | | |
|---|---|---|---|---|
| 2003/0214982 A1* | 11/2003 | Lorek | ................... | H04J 3/0685 370/537 |
| 2010/0321118 A1 | 12/2010 | Smiley et al. | | |
| 2012/0229334 A1* | 9/2012 | Waters | .................... | G01S 19/05 342/357.42 |
| 2015/0071305 A1* | 3/2015 | Wang | .................... | H04L 47/765 370/468 |
| 2018/0109441 A1* | 4/2018 | Meyer | ................... | H04J 3/0667 |
| 2020/0266895 A1* | 8/2020 | Fordell | ..................... | G06F 1/14 |
| 2021/0203427 A1 | 7/2021 | Ambeskar et al. | | |
| 2023/0021450 A1* | 1/2023 | Cook | ................ | H04W 56/0015 |

OTHER PUBLICATIONS

Notification Concerning Transmittal of International Preliminary Report on Patentability in PCT/US2023/014160, dated Nov. 21, 2024.
Written Opinion in PCT/US2023/014160, dated Jun. 7, 2023.

* cited by examiner

*Primary Examiner* — Jutai Kao
(74) *Attorney, Agent, or Firm* — Global IP Counselors, LLP

(57) ABSTRACT

Communication systems and methods are disclosed herein. In an embodiment, a communication system includes a grandmaster clock and a modem unit. The grandmaster clock is configured to output a primary clock reference based on a received signal. The modem unit is configured for communication with a remote terminal. The modem unit includes a network clock configured to be tuned based on the primary clock reference. The network clock is further configured to output a first signal to be used for a time reference for communications with the remote terminal. The modem unit also includes a master clock configured to be tuned based on the primary clock reference. The master clock is further configured to output a second signal to be used for a frequency reference for communications with the remote terminal.

20 Claims, 4 Drawing Sheets

COMMUNICATION SYSTEMS AND METHODS FOR SYNCHRONIZING CLOCK TIMING AND FREQUENCY

BACKGROUND

Field of the Invention

The present disclosure generally relates to communication systems and methods. In particular, the present disclosure relates to communication systems and methods for synchronizing clock timing and frequency.

Background Information

Satellite communication systems enable communication via terrestrial data networks such as the Internet. These systems typically utilize remote terminals or very small aperture terminals (VSATs) at user locations. The remote terminals are associated with a gateway or ground station which provides a point of connection to the terrestrial data networks. The inroute subsystems at the gateways use Time-Division Multiple Access (TDMA) time slots to allocate bandwidth among the remote terminals. With TDMA, the remote terminals transmit data to the gateway within a narrow time window with reference to a frame at the gateway. The frame is the time period for distributing the bandwidth in distinct time slots. A frame typically has a predetermined time period and is identified with a frame number. For a remote terminal to establish a time reference synchronized with the gateway's time reference, the remote terminal can receive feedback through Superframe Numbering Packets (SFNP) from the gateway.

Frame and timing synchronization is essential for the functioning of a TDMA-based subsystem. It is necessary to accurately synchronize the allocation of the inroute bandwidth to the remote terminals and synchronize the transmission of data by the remote terminals and reception of data at the gateway. For this synchronization to work properly, the gateway and remote terminal must have accurate clock timing and frequency. Frequency synchronization is important for accurate and stable frequency synthesis because the outroute module synthesizes the outroute signals (outroute channels) and the inroute module synthesizes the received frequencies to receive transmitted signals (inroute channels).

SUMMARY

The present disclosure provides systems and methods for synchronizing clock timing and frequency, for example, of gateway components to a GPS reference. These systems and methods are capable of synchronizing frequency and time with high accuracy to a GPS external reference signal. These systems and methods also enable a gateway modem to operate reliably in the absence of a GPS external reference signal for long periods of time. The disclosed systems and methods are further advantageous, for example, because they enable a TDMA-based inroute subsystem to operate with low aperture size and a high bits/Hz efficiency. The disclosed systems and methods also allow operation with low errors due to accurate frequency synchronization.

In view of the state of the known technology, one aspect of the present disclosure is to provide a communication system. The communication system includes a grandmaster clock and a modem unit. The grandmaster clock is configured to output a primary clock reference based on a received signal. The modem unit is configured for communication with a remote terminal. The modem unit includes a network clock configured to be tuned based on the primary clock reference. The network clock is further configured to output a first signal to be used for a time reference for communications with the remote terminal. The modem unit also includes a master clock configured to be tuned based on the primary clock reference. The master clock is further configured to output a second signal to be used for a frequency reference for communications with the remote terminal.

Another aspect of the present disclosure is to provide a modem unit for a communication system. The modem unit includes a network clock, a master clock, and a marker generator. The network clock is configured to output a first signal. The master clock is configured to output a second signal. The marker generator is configured to derive a time reference from the first signal of the network clock and derive a frequency reference from the second signal of the master clock. The master clock is referenced by the network clock.

Another aspect of the present disclosure is to provide a communication method. The communication method includes receiving a first signal from a network clock, receiving a second signal from a master clock, deriving a time reference from the first signal of the network clock, deriving a frequency reference from the second signal of the master clock, and communicating with a remote terminal using the time reference and the frequency reference.

Also, other objects, features, aspects and advantages of the disclosed devices, systems and methods will become apparent to those skilled in the art in the field of satellite systems and other communication systems from the following detailed description, which, taken in conjunction with the annexed drawings, discloses preferred embodiments of devices, systems and methods with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
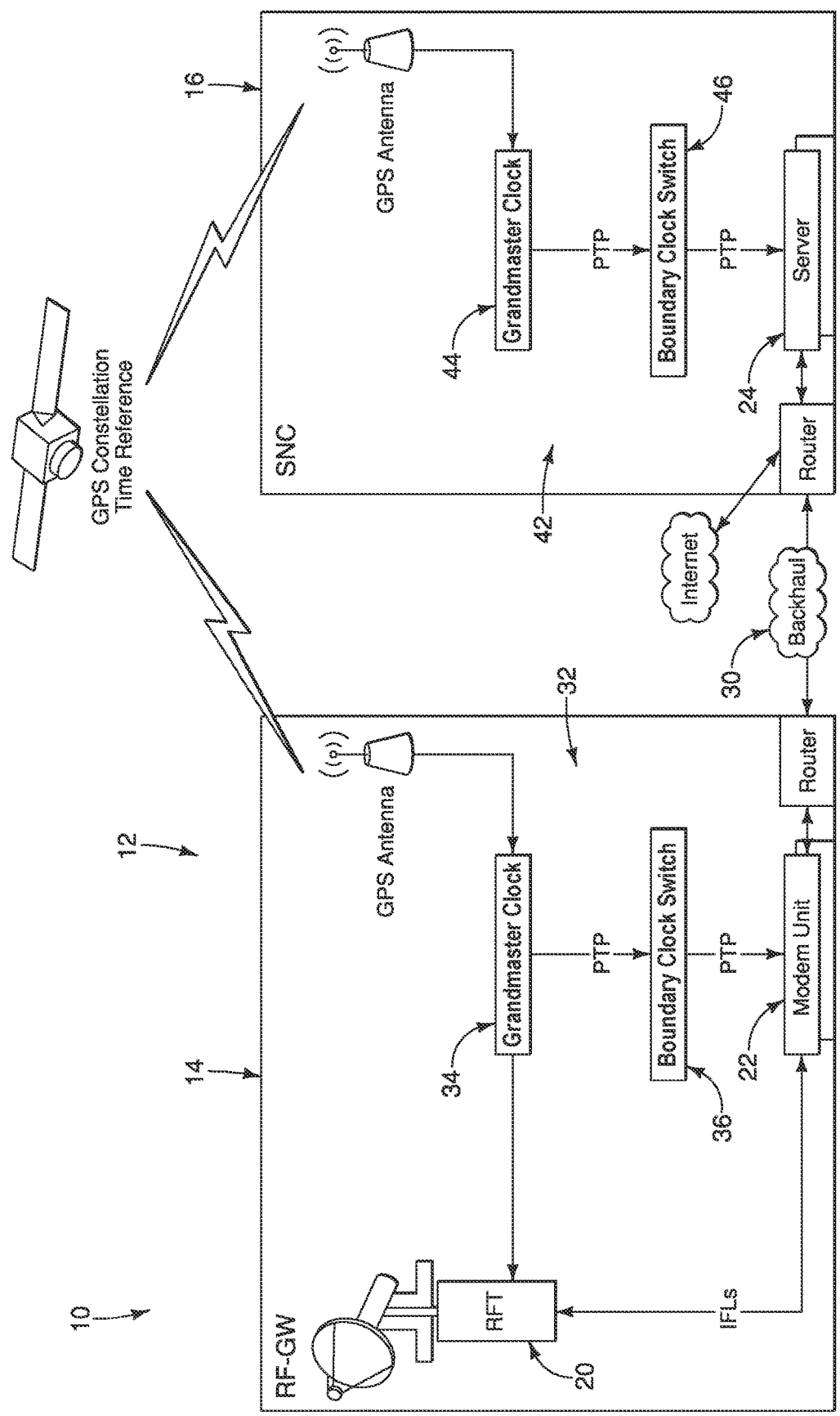
FIG. 1 illustrates an example embodiment of a communication system in accordance with the present disclosure.

FIG. 1 illustrates an example embodiment of a communication system 10 in accordance with the present disclosure. In the illustrated embodiment, the communication system 10 is a satellite communication system which utilizes satellite GPS signals. In the illustrated embodiment, the communication system 10 includes a terrestrially mounted satellite gateway 12 with a radio frequency gateway (RFGW) 14 and a satellite network core (SNC) 16. Here, the gateway functionality is split into the RFGW 14 and SNC 16. With this configuration, the satellite gateway 12 provides remote terminals or very small aperture terminals (VSATs) with Internet access via a satellite communication network. FIG. 1 illustrates components of the gateway 12 related to a gateway timing architecture or subsystem, but those of ordinary skill in the art will recognize from this disclosure that the gateway 12 can include other components as understood in this field.

In the illustrated embodiment, the RFGW 14 provides physical layer functions, such as an interface to a radio frequency terminal (RFT) 20, modulation/demodulation, and the like. Specifically, the RFGW 14 includes hardware entities, such as modem units 22 (e.g., modems 22) with modulators 50 and demodulators 52. The modem units 22 can run, for example, on Xilinx SOC (system on a chip) based embedded platforms. In the illustrated embodiment, the SNC 16 provides link and network layer functions, such as Internet point of presence, link layer processing, IP processing, web acceleration, and the like. These functions are performed by software entities, such as an Inroute Group Manager (IGM), a Code Rate Organizer (CRO), an IP gateway (IPGW), and the like, hosted on servers 24. The servers 24 can include an electronic controller, a processor or a microcomputer that can host the software entities.

In the illustrated embodiment, the RFGW 14 and the SNC 16 are located at separate locations, respectively, and are connected to each other via a communication network or backhaul network 30. With these configurations of the RFGW 14 and the SNC 16, inroute and outroute subsystems of the satellite gateway 12 can be formed. In the illustrated embodiment, a single RFGW 14 and a single SNC 16 are shown, but multiple RFGWs 14 and multiple SNCs 16 can be connected to the network 30 for providing redundancy of the communication system 10. In the illustrated embodiment, the path delays between the RFGW 14 and the SNC 16 can be variable. Further, in the case of multiple RFCWs 14 and multiple SNCs 16 being connected to the communication network 30, there can be more than one path between any pairs of RFGWs 16 and SNCs 16. The RFGW 14 and the SNC 16 can also be located at a same location.

In the illustrated embodiment, the communication system 10 utilizes the Precision Time Protocol (PTP) for frame synchronization. The PTP is a synchronization protocol defined in IEEE 1588 to synchronize clocks throughout a computer network. The RFGW 14 has a PTP network or local area network (LAN) 32 (e.g., network 32) including a grandmaster clock 34 and a boundary clock 36. Although only one grandmaster clock 34 and one boundary clock 36 are shown in FIG. 1, the network 32 can include multiple sets (i.e., a primary set and a secondary set) of grandmaster clocks 34 and boundary clocks 36 to provide scalability and/or redundancy for the timing subsystem of the satellite gateway 12. In another embodiment, more than two sets of grandmaster clocks 34 and boundary clocks 36 can be provided as needed and/or desired.

In the illustrated embodiment, the grandmaster clock 34 is configured to output a primary clock reference based on a received signal. More specifically, the grandmaster clock 34 provides a primary clock reference using a GPS constellation time reference or a GPS signal as a time source. The GPS signal is obtained by the grandmaster clock 34 through a GPS antenna. As shown in FIG. 1, the GPS signal can be obtained by the GPS antenna from a satellite. The boundary clock 34 is configured to relay the primary clock reference to the modem unit 22. More specifically, the boundary clock 36 is connected to the grandmaster clock 34 via the network 32 using the PTP, and relays and distributes the primary clock reference as a PTP clock to target modem units 22 which serve as secondary or end nodes of the PTP network 32. With this configuration, the communication system 10 is configured to use the PTP to synchronize host clocks of the modem units 22 (e.g., modulator and demodulator clocks) in the RFGW 14 to the GPS time and frequency reference (primary clock reference).

Similarly, in the illustrated embodiment, the SNC 16 has a PTP network or local area network (LAN) 42 (e.g., network 42) including a grandmaster clock 44 and a boundary clock 46. Although only one grandmaster clock 44 and one boundary clock 46 are shown in FIG. 1, the network 42 can include two sets (i.e., a primary set and a secondary set) of grandmaster clocks 44 and boundary clocks 46 to provide scalability and/or redundancy for the timing subsystem of the satellite gateway 12. In another embodiment, more than two sets of grandmaster clocks 44 and boundary clocks 46 can be provided as needed and/or desired.

In the illustrated embodiment, the grandmaster clock 44 is configured to output a primary clock reference based on a received signal. More specifically, the grandmaster clock 44 provides a primary clock reference using a GPS constellation time reference or a GPS signal as a time source. The GPS signal is obtained by the grandmaster clock 44 through a GPS antenna. As shown in FIG. 1, the GPS signal can be obtained by the GPS antenna from a satellite. The boundary clock 46 is configured to relay the primary clock reference to the modem unit 22. More specifically, the boundary clock 46 is connected to the grandmaster clock 44 via the network 42 using the PTP, and relays and distributes the primary clock reference as a PTP clock to the servers 24 which serves as secondary nodes of the PTP network 42. With this configuration, the satellite communication system 10 uses the PTP to synchronize host clocks of the servers 24 in the SNC 16 to the GPS time and frequency reference (primary clock reference). The PIP can also be used at the SNC 16 to derive TDMA frame markers (frame events) and number references for the IGM and the CRO. The IGM performs inroute link layer functions, such as inroute bandwidth allocation and packet reassembly into IP packets. The CRO is an outroute link layer processing element that is responsible for generating timing packet references for remote terminal timing synchronization.

In the illustrated embodiment, the grandmaster clocks 34, 44 of the RFGW 14 and the SNC 16 have a common or single time source. Specifically, the grandmaster clocks 34, 44 use the GPS signal as the common time source. Thus, once the host clocks of the modem units 22 and the servers 24 are synchronized to the primary clock references of the grandmaster clocks 34, 44, respectively, then the RFGW 14 and the SNC 16 can also be synchronized with respect to each other regardless of the network quality of the backhaul network 30 between the RFGW 14 and the SNC 16. If multiple RFGWs 14 and multiple SNCs 16 are provided to the satellite gateway 12, all the RFGWs 14 and the SNCs 16 can be synchronized in the same manner regardless of the number of paths between the RFGWs 14 and the SNCs 16. In the illustrated embodiment, the GPS signal is utilized as the common time source, but the grandmaster clocks 34, 44 of the RFGW 14 and the SNC 16 can have a common time source other than the GPS signal as needed and/or desired.

The modem unit 22 is configured for communication with a remote terminal More specifically, the modem unit 22 is configured for Time-Division Multiple Access (TDMA) communication with a remote terminal. The modem unit 22 derives a Time-division Multiple Access (TDMA) time reference (e.g., SOSF) and frequency reference (e.g., 10 MHz) for frequency synthesis in the modulator/demodulator from its PTP synchronized local clocks. The modem unit 22 operates at the physical layer and has a high accuracy/jitter requirement for its clock frequency and clock time synchronization relative to the GPS. The high accuracy is required to allow operating the inroute efficiently with small TDMA apertures and a high modem performance with low frequency variation due to the synchronized frequency.

The modem unit 22 uses the PTP as a network timing synchronization protocol to synchronize its local clocks to the reference GPS signal. The PTP operates by measuring the drift (error) of a local clock in relation to an external clock (based on the primary clock reference) and adjusting the target clock to account for the drift. The target clocks of the modulators and demodulators are end nodes of the PTP network.

Figure 2:
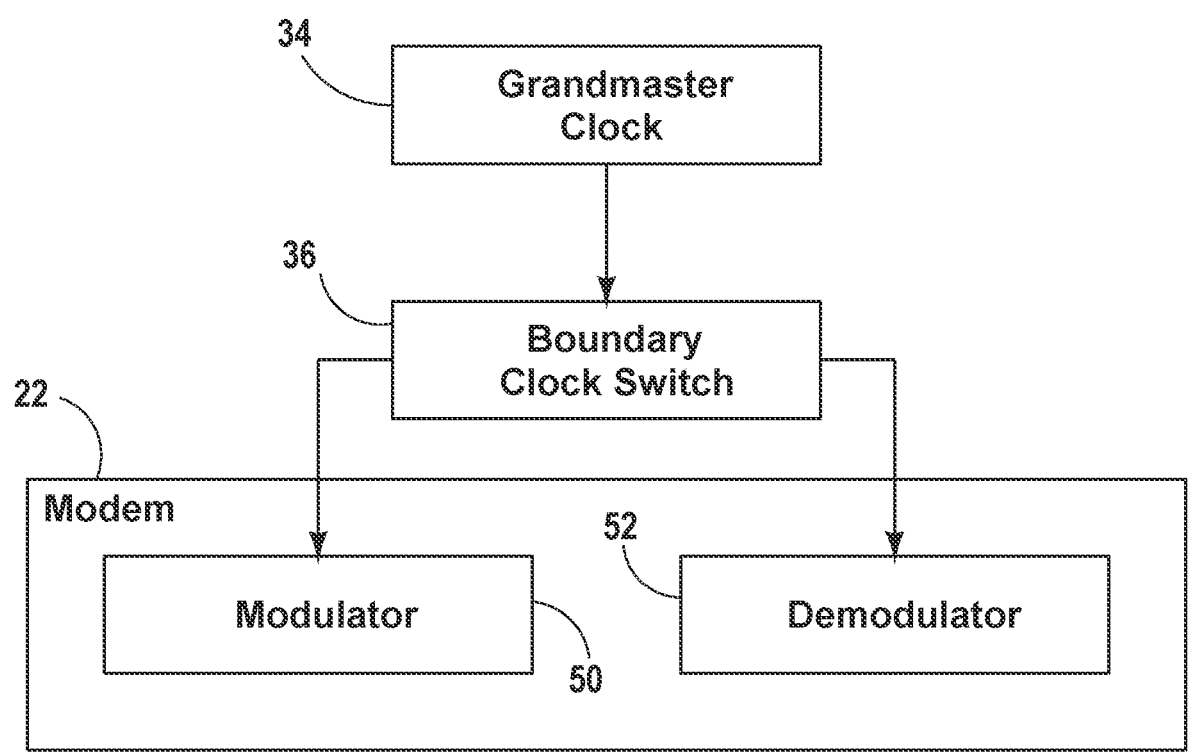
FIG. 2 illustrates an example embodiment of a portion of a PTP network or local area network of the communication system of FIG. 1.

In the illustrated embodiment, the grandmaster clock 34 includes a GPS receiver synced to the GPS satellite constellation. In the illustrated embodiment, the boundary clock 36 includes a PTP aware switch that has an on-board clock which synchronizes to the GPS reference. The boundary clock 36 provides the primary clock (GPS-based) reference to the modem unit 22. More specifically, the boundary clock 36 provides the primary clock reference to the modem unit 22 as a PTP clock reference. In the embodiment illustrated in FIG. 2, the boundary clock 36 switch provides the primary clock reference to the modulator 50 and the demodulator 52 of the modem unit 22. The modulator 50 and the demodulator 52 operate at the physical layer of the communication system 10.

The PTP components and the timing distribution provide timing and frequency references. The outroute and inroute components at the RFGW 14 including modulators 50 and demodulators 52 derive their frequency and timing references from the PTP based synchronization system. Remote terminals, in turn, derive their frequency and timing references using the outroute signal and the Superframe Numbering Packet (SFNP) control messages.

Figure 3:
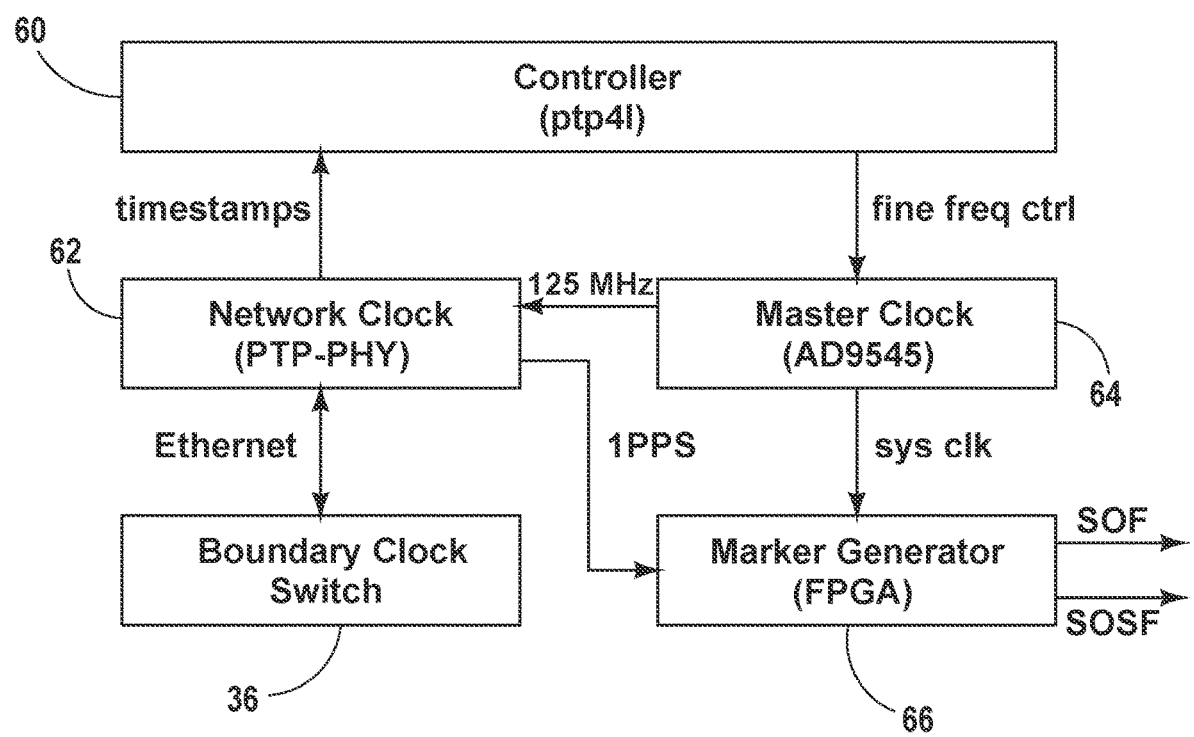
FIG. 3 illustrates an example embodiment of hardware and software portions of a modem unit of the communication system of FIG. 1.
Figure 4:
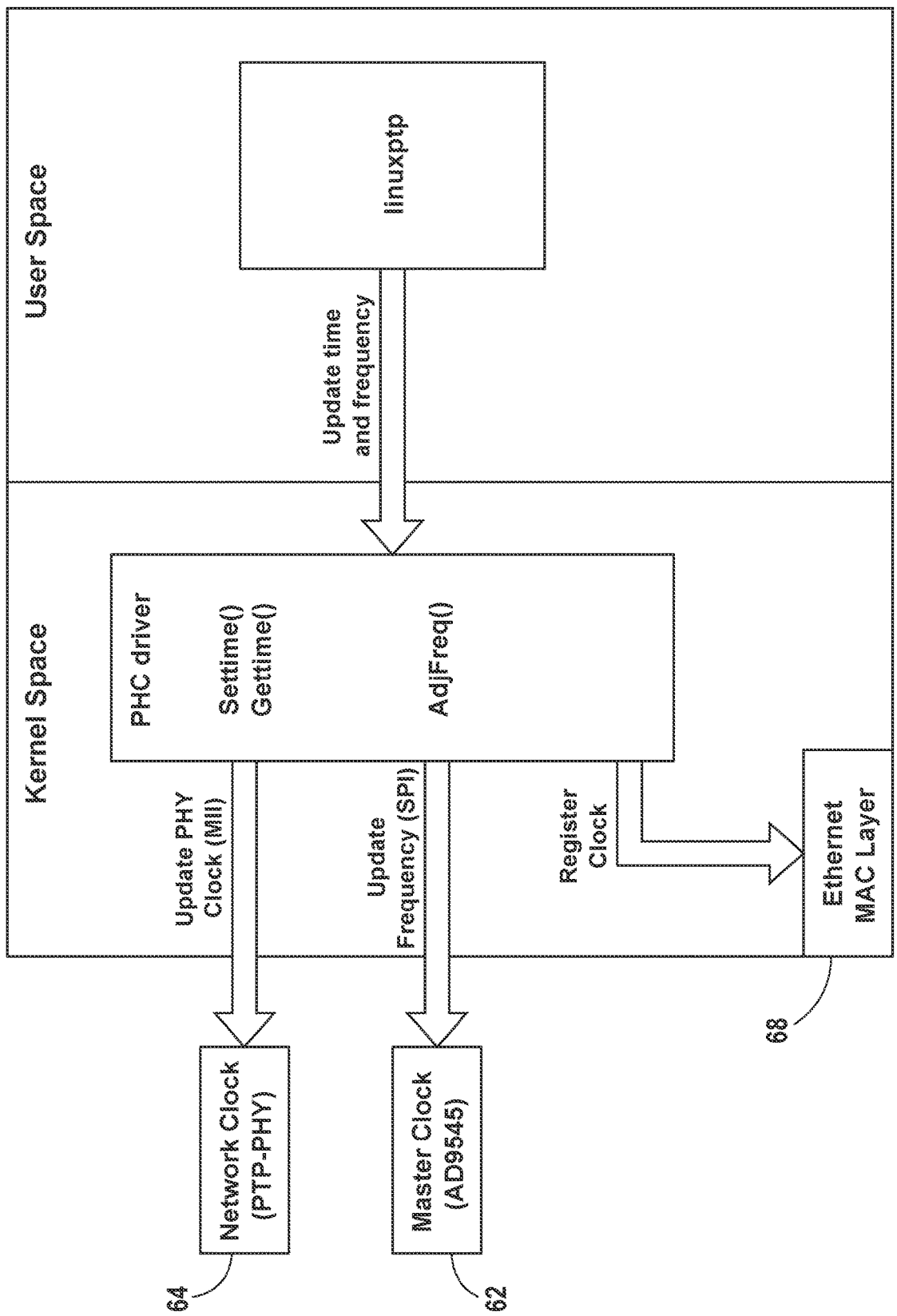
FIG. 4 illustrates another example embodiment of hardware and software portions of a modem unit of the communication system of FIG. 1.

The modem unit 22 has a component timing architecture including software and hardware elements that derive the references for frequency generation and TDMA timing. FIGS. 3 and 4 illustrates an example embodiment of certain hardware and software elements of the RFGW 14. One or more of the elements shown in FIGS. 3 and 4 can be included as pan of the network 32, or more specifically included as pan of the modem unit 22. In the illustrated embodiment of FIG. 3, the communication system 10 includes one or more of a controller 60, a network clock 62, a master clock 64, and a marker generator 66.

The communication system 10 includes a controller 60. More specifically, the modem unit 22 includes a controller 60. The controller 60 is configured to implement the clock synchronization methods described herein. The controller 60 includes programming for the clock synchronization methods described herein. In the illustrated embodiment, the programming includes a ptp41 program. As understood by those of ordinary skill in the art from this disclosure, ptp41 is an implementation of the PTP according to the IEEE 1588 standard. The controller 60 can also include the other software elements discussed herein.

The controller 60 can include a microcomputer with a control program that operates as discussed herein. The control program can include the ptp41 program. The controller program can also include the other software elements discussed herein. The controller 60 can also include other conventional components such as an input interface circuit, an output interface circuit, and storage devices such as a ROM (Read Only Memory) device and a RAM (Random Access Memory) device. The RAM and ROM store processing results and control programs that are run by the controller 60. The controller 60 is operatively coupled to the other components as appropriate, in a conventional manner. It will be apparent to those skilled in the art from this disclosure that the precise structure and algorithms for the controller 60 can be any combination of hardware and software that will carry out the functions of the present disclosure.

The communication system 10 includes a network clock 62. More specifically, the modem unit 22 includes a network clock 62. The network clock 62 enables synchronization of the modem unit 22 with the grandmaster clock 34. The network clock 62 thus enables synchronization of the modem unit 22 with the GPS reference. The network clock 62 also enables accurate TDMA processing by the marker generator 66.

In the illustrated embodiment, the network clock 62 is a hardware clock in the local area network (LAN) physical layer (PHY). The network clock 62 embedded into the LAN PHY is a PTP aware clock. The network clock 62 is typically a lower quality clock. Here, the network clock 62 is the PTP aware component of the modem unit 22 that participates in the PTP network protocol.

As illustrated in FIG. 3, the network clock 62 is configured to receive the primary clock reference from the boundary clock 36. The network clock 62 is configured to receive the primary clock reference from the boundary clock 36 as a PTP clock reference according to the PTP.

As illustrated in FIG. 3, the network clock 62 is configured to output timestamps to the controller 60. The timestamp is related to the primary clock reference received via the boundary clock 36. Generation of the timestamps is discussed in more detail below. The controller 60 is configured to use the timestamps to update the network clock 62 (time of day) to compensate for error/drift. The timestamps placed by the network clock 62 therefore are used to compensate for error/drift. The modem unit is configured to generate a timestamp related to the primary clock reference.

The network clock 62 is configured to output a first signal to be used for a time reference for communication with a remote terminal (e.g., TDMA signal communication). As illustrated in FIG. 3, the network clock 62 is configured to output the first signal to the marker generator 66. In the illustrated embodiment, the network clock 62 is configured to output a 1 pps (pulse per second) signal which is synchronized to the time of day (e.g., epoch time). The marker generator 66 derives a time reference via the pulse signal from the network clock 64. More specifically, the pulse signal is routed to the input of the marker generator 66 and serves as a reference for the marker generator 66 to generate a Start of Superframe (SOSF) marker as an event for TDMA processing.

The communication system 10 includes a master clock 64. More specifically, the modem unit 22 includes a master clock 64. The master clock 64 enables synchronization of the modem unit 22 with the grandmaster clock 34. The master clock 64 thus enables synchronization of the modem unit 22 with the GPS reference. The master clock 64 also enables accurate TDMA processing by the marker generator 66. The master clock 64 generates and distributes a 10 Mhz signal to the marker generator 66 (the modulator/demodulator FPGAs). The marker generator 66 (FPGA) uses the 10 Mhz as reference signal to synthesize signal transmit and receive frequencies. The master clock is configured to generate and distribute a frequency reference for the FPGA to synthesize communication frequency with a remote terminal.

In the illustrated embodiment, the master clock 64 includes an AD9545 evaluation board. In an embodiment, the master clock 64 includes an oscillator (e.g., an on-board oscillator). The oscillator is used as a primary frequency generator that drives other hardware clocks of the modem unit 22 such as one or more field programmable gate array (FPGA) of the marker generator 66. The oscillator is synchronized to the external GPS reference using PTP protocol. In the illustrated embodiment, the oscillator is a numerically configurable oscillator that is used to update/reconfigure the master clock 64 with frequency updates.

As illustrated in FIG. 3, the master clock 64 is configured to output a signal to the network clock 62. In the illustrated embodiment, the master clock 64 is configured to output a 125 MHz signal to the network clock 62. This output signal from the master clock 64 is provided as a reference to network clock 62. This drives the network clock 62 and consequently the PTP of the modem unit 22 through the master clock 64. The network clock 62 latches to the 125 MHz signal from master clock 64 and consequently derives its clock frequency from the master clock 64.

The master clock further is configured to output a second signal to be used for a frequency reference for communication with a remote terminal (e.g., TDMA signal communication). As illustrated in FIG. 3, the master clock 64 is configured to output the second signal (e.g., sys clk in FIG. 3) to the marker generator 66. The second signal includes a frequency reference. In the illustrated embodiment, the master clock 64 outputs the frequency reference to the marker generator 66. More specifically, the master clock 64 distributes its PTP synchronized clock by providing output clock waveforms at different frequencies as inputs to the marker generator 66 (the modulator/demodulator FPGAs). This input at the marker generator 66 (the modulator/demodulator FPGAs) is used as a reference by the marker generator 66 (the modulator/demodulator FPGAs) to synthesize channel frequencies from its numerically configurable oscillators. Having a reliable and stable master clock 64 that is separate from the network clock 62 enables an accurate frequency reference with a slow drift and slow loss of sync in the absence and/or failure of an external PTP reference.

The controller 60 is configured to tune the frequency of the master clock 64. More specifically, the controller 60 is configured to tune the frequency oscillator of the master clock. The controller 60 is configured to tune the frequency of the master clock 64 by outputting a tuning signal (e.g., fine freq ctrl in FIG. 3) to the master clock 64. This represents frequency error of the master clock 64 relative to the external GPS reference. The controller is configured to tune the master clock 64 based on the PTP timestamps received from the network clock 62. By tuning the master clock 64, the master clock 64 is compensated for error/drift as determined by the controller 60. In this way, the master clock 64 is synchronized with the PTP.

The communication system 10 includes a marker generator 66. More specifically, the modem unit 22 includes a marker generator 66. As illustrated in FIG. 3, the marker generator includes a field programmable gate array (FPGA). Although only one FPGA is shown in FIG. 3, the marker generator 66 can include multiple FPGAs.

The marker generator 66 is configured to process TDMA signals. Specifically, the marker generator 66 is configured to generate markers for TDMA processing. More specifically, the marker generator 66 is configured to process TDMA signals required to be synced to the PTP time for detecting the TDMA marker event (SOSF) and distributing it to the other FPGAs like a channelizer for TDMA processing.

As illustrated in FIG. 3, the marker generator 66 is configured to receive a first signal as an input from the network clock 62. In the illustrated embodiment, the first signal includes a pulse signal from the network clock 62 (e.g., 1 pulse per second). As illustrated in FIG. 3, the marker generator 66 is also configured to receive a second signal as an input from the master clock 64. In the illustrated embodiment, the second signal includes a frequency reference as an input from the master clock 64 (e.g., sys clk in FIG. 3). More specifically, the second signal includes output clock waveforms at different frequencies. The marker generator 66 is configured to derive a time reference from the first signal of the network clock and derive a frequency reference from the second signal of the master clock. More specifically, the marker generator 66 (the modulator/demodulator FPGA) is configured to derive a time reference via the pulse signal from the network clock 62 and derive a frequency reference via an output clock waveform from the master clock 64.

The marker generator 66 enables TDMA processing with a remote terminal. More specifically, the marker generator 66 is configured to generate one or more markers for TDMA processing. As seen in FIG. 3, a marker can include a Start of Superframe (SOSF) marker. As also seen in FIG. 3, a marker can include a Start of Frame (SOF) marker. These markers can be used to synchronize the timing of one or more remote terminal and thus enable communication between the modem unit one or more remote terminal for time synchronized protocol such as TDMA. These markers therefore enable accurate communication between the RFGW 14 and one or more remote terminals.

To derive an accurate PTP time reference, PTP timestamping is performed at the entry and exit point of the PTP event packets from the modem unit 22. In the illustrated embodiment, this entry/exit point occurs at the network clock 62. This can also be referred to as hardware timestamping. Hardware timestamping and a high-quality master clock 64 that is separate from the network clock 62 together enable a highly accurate synchronization of the modem unit 22 to the GPS using the PTP network.

The network clock 62 configured to be tuned based on the primary clock reference. More specifically, the network clock 62 is configured to be tuned based on PTP timestamps relating to primary clock references. The master clock 64 is also configured to be tuned based on the primary clock reference and timestamps from network clock reference. More specifically, the master clock 64 is also configured to be tuned based on timestamps relating to primary clock references. The controller 60 is configured to use the timestamps received from the network clock 62 to compensate for the error/offset of the master clock 64. The controller 60 is configured to use this computed error offset to tune the network clock 62 and/or the master clock 64. The controller 60 is configured to send separate updates to the master clock 64 (frequency) and the network clock 62 (time of day) from application software via the driver interface. Thus, the controller 60 is configured to tune a time of day of the network clock 62 and a frequency of the master clock 64 using one or more timestamp.

FIG. 4 illustrates the software design blocks and their functions to update the hardware clocks with errors computed by the software applications of the controller 60 (e.g., linuxptp, ptp41). The software applications can include interface software and application software.

The interface software is configured to communicate with the local area network (LAN) physical layer (PHY) hardware and the PTP application software. The interface software is typically a low-level software part like a device driver that primarily communicates with the LAN PHY of the network clock 62 to obtain the timestamps (see FIG. 3) and then pass the timestamps along to the application software for computing the error/offset. The interface software is also configured to update the master clock 64 and the network clock 62 to compensate for error/drift computed by the application software. The interface software is configured to send separate updates to the master clock 64 (frequency) and the network clock 62 (time of day) via the driver interface. In the illustrated embodiment, the master clock 64 has a numerically configurable oscillator that is used to update/reconfigure the master clock 64 with frequency updates.

The application software is configured to compute the frequency variation of the master clock 64 using PTP network sync protocol and to recover the frequency of the master clock 64 using the software interface to the master clock 64. The application software is also configured to sync the marker generator 66 time counters (time of day) to the master clock 64. The marker generator 66 that processes the TDMA signal is required to be synced to the PTP time for detecting a TDMA marker event (SOSF) and distributing it to other FPGAs such as a channelizer for TDMA processing. The alignment of the marker generator 66 to PTP time is a two-step method. The 1 pps signal from network clock 62 is provided as an input to the FPGA of the marker generator 66 to align the second's tick of the PTP time. The actual time of the PTP clock from the epoch is programmed by the software application into a firmware time counter register as part of the hardware initialization procedure. The application reads PTP time from the network clock 62 (LAN PHY) and programs the seconds from the epoch into the seconds time counter register of the FPGA.

The network clock 62 is configured to generate timestamps. In an embodiment, the Ethernet LAN PHY in FIG. 4 has a PTP clock within the chip. It can recognize the PTP event messages and generate/insert the timestamps into the event messages which then get passed along to the upper layers of the operating system stack. There are two timestamps required at the LAN PHY for the application to compute the offsets. Below are the methods employed to obtain and pass the timestamps to the application software.

The MAC layer 68 passes a received frame to the stack in the normal manner, as a buffer (e.g., skbuff). Before doing any input processing, the kernel sends the buffer to the PHY driver's callback. The PHY driver retrieves the timestamp, places it at a specified location in the metadata of the buffer and returns it to the kernel stack.

The kernel stack sends a buffer (e.g, skbuff) to the MAC layer 68 for transmission in the normal manner. When the MAC layer 68 releases the buffer, the kernel passes the buffer to the PHY driver's callback. The PHY driver retrieves the timestamp, places it at a specified location in the metadata of the buffer and returns the buffer to the kernel stack.

The embodiments described herein provide improved systems and methods for synchronizing clock timing and frequency. These systems and methods are advantageous, for example, because they enable a TDMA based inroute subsystem to operate with low aperture size and a high bits/Hz efficiency using a network synchronization protocol. These systems and methods are also advantageous, for example, because they allow for accurate and stable synthesis of signal frequency for low error signal communication with a terminal over a satellite. It should be understood that various changes and modifications to the systems and methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A communication system comprising:
a grandmaster clock configured to output a primary clock reference based on a received signal; and
a modem unit configured for communication with a remote terminal, the modem unit including
a network clock configured to have a time of day be tuned based on a timestamp generated by the network clock which is related to the primary clock reference, the network clock further configured to output a first signal to be used for a time reference for communications with the remote terminal, and
a master clock configured to be tuned based on the primary clock reference, the master clock further configured to output a second signal to be used for a frequency reference for communications with the remote terminal.

2. The communication system of claim 1, wherein
the modem unit is configured for Time-Division Multiple Access (TDMA) signal communication with the remote terminal,
the network clock is configured to output the first signal to be used for the time reference for TDMA signal communications with the remote terminal, and
the master clock is configured to output the second signal to be used for the frequency reference for TDMA signal communications with the remote terminal.

3. The communication system of claim 1, comprising
a boundary clock configured to relay the primary clock reference to the modem unit.

4. The communication system of claim 3, wherein
the boundary clock is configured to relay the primary clock reference to the modem unit using Precision Time Protocol (PTP).

5. The communication system of claim 1, wherein
the received signal is a GPS signal received from a satellite.

6. The communication system of claim 1, wherein
the master clock is configured to have a frequency tuned based on the timestamp.

7. The communication system of claim 1, comprising
a marker generator configured to derive the time reference from the first signal and the frequency reference from the second signal.

8. The communication system of claim 1, wherein
the modem unit includes a marker generator configured to generate a Start of Superframe (SOSF) marker or a Start of Frame (SOF) marker.

9. A modem unit for a communication system, the modem unit comprising:
a network clock configured to output a first signal;
a master clock configured to output a second signal;
a marker generator configured to derive a time reference from the first signal of the network clock and a frequency reference from the second signal of the master clock; and
a controller configured to tune a time of day of the network clock based on a timestamp generated by the network clock.

10. The modem unit of claim 9, wherein
the controller is configured to tune a frequency of the master clock based on the timestamp generated by the network clock.

11. The modem unit of claim 9, wherein
the marker generator is configured to generate a Start of Superframe (SOSF) marker or a Start of Frame (SOF) marker.

12. The modem unit of claim 9, wherein
the first signal includes a pulse signal.

13. The modem unit of claim 9, wherein
the second signal includes a clock waveform.

14. The modem unit of claim 9, wherein
the marker generator includes a field programmable gate array (FPGA), and
the master clock is configured to generate and distribute a frequency reference for the FPGA to synthesize communication frequency with a remote terminal.

15. The modem unit of claim 9, wherein
the marker generator is configured to enable Time-Division Multiple Access (TDMA) communication with a remote terminal using the time reference and the frequency reference.

16. A communication method comprising:
receiving a first signal from a network clock that has a time of day tuned based on a timestamp generated by the network clock;
receiving a second signal from a master clock;
deriving a time reference from the first signal of the network clock;
deriving a frequency reference from the second signal of the master clock; and
communicating with a remote terminal using the time reference and the frequency reference.

17. The communication method of claim 16, wherein
communicating with the remote terminal includes generating at least one marker for Time-Division Multiple Access (TDMA) processing.

18. The communication method of claim 16, comprising
tuning a frequency of the master clock based on the timestamp.

19. The communication method of claim 16, wherein
receiving the first signal from the network clock includes receiving a pulse signal from the network clock.

20. The communication method of claim 16, wherein
receiving the second signal from the master clock includes receiving a clock waveform from the master clock.

* * * * *